United States Patent
Schneider

(10) Patent No.: US 9,221,362 B2
(45) Date of Patent: Dec. 29, 2015

(54) VEHICLE SEAT AND UTILITY VEHICLE COMPRISING AT LEAST ONE VEHICLE SEAT

(71) Applicant: GRAMMER AG, Amberg (DE)

(72) Inventor: Franz Schneider, Ebermannsdorf (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 14/314,519

(22) Filed: Jun. 25, 2014

(65) Prior Publication Data

US 2015/0001903 A1 Jan. 1, 2015

(30) Foreign Application Priority Data

Jun. 26, 2013 (DE) .......................... 10 2013 106 721

(51) Int. Cl.
| | | |
|---|---|---|
| *B60N 2/22* | (2006.01) | |
| *B60N 2/48* | (2006.01) | |
| *B60N 2/38* | (2006.01) | |
| *F16C 29/02* | (2006.01) | |
| *B60N 2/02* | (2006.01) | |

(52) U.S. Cl.
CPC ............ *B60N 2/2209* (2013.01); *B60N 2/2222* (2013.01); *B60N 2/38* (2013.01); *B60N 2/4867* (2013.01); *F16C 29/02* (2013.01); *B60N 2002/0204* (2013.01); *B60N 2002/0216* (2013.01); *B60N 2002/0288* (2013.01)

(58) Field of Classification Search
CPC .. B60N 2/4808; B60N 2/4864; B60N 2/4867; B60N 2/2222; B60N 2/38; B60N 2002/4897; B60N 2/4805; B60N 2002/0216; B60N 2002/0204; B60N 2/2209; F16C 29/02

USPC .......... 297/396, 403, 408, 391, 61, 397, 398, 297/406, 410, 405
See application file for complete search history.

(56) References Cited

U.S. PATENT DOCUMENTS

| | | | |
|---|---|---|---|
| 769,495 | A | 9/1904 | Schroeder |
| 937,343 | A | 10/1909 | Wallace |
| 1,257,427 | A | 2/1918 | Underwood |
| 2,835,311 | A | 5/1958 | Reeves et al. |

(Continued)

FOREIGN PATENT DOCUMENTS

| | | |
|---|---|---|
| AT | 321497 | 4/1975 |
| DE | 1796557 | 9/1959 |

(Continued)

OTHER PUBLICATIONS

European Search Report for European Patent Application No. 14163934.4, mailed Oct. 28, 2014, 6 pages.

(Continued)

*Primary Examiner* — Joshua J Michener
*Assistant Examiner* — Matthew Gitlin
(74) *Attorney, Agent, or Firm* — Sheridan Ross P.C.

(57) ABSTRACT

The invention relates to a vehicle seat comprising a seat part, a backrest and a bearing device for supporting a backrest extension part, in particular an upper backrest part, relative to a lower backrest part of the backrest of the vehicle seat, wherein the bearing device comprises a plurality of plain bearing bush units for supporting elongated transverse elements of the backrest extension part along sliding axes arranged perpendicular to the backrest, wherein the plain bearing bush units are assembled from identically designed asymmetrical bearing bush parts.

19 Claims, 4 Drawing Sheets

(56) References Cited

U.S. PATENT DOCUMENTS

| | | | |
|---|---|---|---|
| 3,300,249 A | 1/1967 | Schneider | |
| 3,342,528 A | 9/1967 | Radke et al. | |
| 3,348,880 A | 10/1967 | Swann | |
| 3,393,938 A | 7/1968 | Meyer et al. | |
| 3,888,329 A | 6/1975 | Monaghan | |
| 4,108,493 A | 8/1978 | Naus | |
| 4,195,882 A | 4/1980 | Daswick et al. | |
| 4,634,176 A | 1/1987 | Scott | |
| 4,679,854 A | 7/1987 | Putsch et al. | |
| 5,108,150 A | 4/1992 | Stas et al. | |
| 5,154,477 A | 10/1992 | Lacy | |
| 5,211,696 A | 5/1993 | Lacy | |
| 5,547,247 A | 8/1996 | Dixon | |
| 5,567,015 A | 10/1996 | Arias | |
| 5,803,542 A | 9/1998 | Insausti | |
| 6,079,784 A | 6/2000 | Peachey | |
| 6,224,149 B1 | 5/2001 | Gevaert | |
| 6,305,749 B1 | 10/2001 | O'Connor et al. | |
| 6,513,781 B1 | 2/2003 | Meyer et al. | |
| 6,648,416 B2 | 11/2003 | O'Connor et al. | |
| 6,893,095 B2 | 5/2005 | Schambre et al. | |
| 6,942,297 B2 * | 9/2005 | Johnson | 297/397 |
| 7,178,874 B2 | 2/2007 | Demski | |
| 7,210,735 B2 | 5/2007 | Lang | |
| 7,780,237 B2 * | 8/2010 | Chen et al. | 297/397 |
| 7,931,331 B2 * | 4/2011 | Gomes et al. | 297/216.12 |
| 8,007,045 B2 * | 8/2011 | Meiller et al. | 297/408 |
| 8,794,705 B2 * | 8/2014 | Steinmetz et al. | 297/410 |
| 8,998,335 B2 * | 4/2015 | Buehlmeyer et al. | 297/409 |
| 2003/0155797 A1 | 8/2003 | Amirault et al. | |
| 2013/0134753 A1 | 5/2013 | Buehlmeyer et al. | |
| 2013/0175837 A1 | 7/2013 | Buehlmeyer et al. | |
| 2013/0181500 A1 | 7/2013 | Buehlmeyer et al. | |

FOREIGN PATENT DOCUMENTS

| | | |
|---|---|---|
| DE | 7228055 | 11/1972 |
| DE | 2551617 | 6/1977 |
| DE | 2644485 | 4/1978 |
| DE | 3046049 | 7/1982 |
| DE | 4126518 | 2/1993 |
| DE | 4215628 | 11/1993 |
| DE | 4405397 | 3/1995 |
| DE | 19937378 | 7/2000 |
| DE | 19920220 | 11/2000 |
| DE | 20307102 | 10/2003 |
| DE | 69913203 | 9/2004 |
| DE | 19628861 | 6/2005 |
| DE | 102004007043 | 6/2005 |
| DE | 102004052604 | 4/2006 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0729867 | 9/1996 |
| EP | 0972671 | 1/2000 |
| EP | 2599658 | 6/2013 |
| EP | 2599659 | 6/2013 |
| FR | 2748432 | 11/1997 |
| FR | 2895336 | 6/2007 |
| FR | 2927855 | 8/2009 |
| FR | 2929185 | 10/2009 |
| FR | 2930208 | 10/2009 |
| FR | 2932429 | 12/2009 |
| FR | 2932429 A1 * | 12/2009 |
| GB | 2277869 | 11/1994 |
| GB | 2453165 | 4/2009 |
| GB | 2472836 | 2/2011 |
| WO | WO 03/068556 | 8/2003 |
| WO | WO 2011/020919 | 2/2011 |

OTHER PUBLICATIONS

Official Action for U.S. Appl. No. 13/686,337, mailed Dec. 2, 2014 12 pages.

Notice of Allowance for U.S. Appl. No. 13/686,409 mailed Nov. 28, 2014, 8 pages.

Official Action for U.S. Appl. No. 13/691,055, mailed Sep. 19, 2014, 9 pages.

Examination Report for German Patent Application No. 102011055897.7, dated Jul. 25, 2014, 8 pages.

Extended European Search Report for European Patent Application No. 14163935.1, dated Oct. 30, 2014, 6 pages.

Official Action (with English translation) for Chinese Patent Application No. 2012104992473, dated Nov. 3, 2014, 13 pages.

Official Action (with English translation) for Chinese Patent Application No. 201210489228, dated Dec. 1, 2014, 29 pages.

Official Action (no English translation available) for German Patent Application No. 12194557.0, dated Jan. 29, 2015, 5 pages.

Official Action (no English translation available) for German Patent Application No. 102013110445.2 dated Mar. 10, 2014, 3 pages.

Official Action (no English translation available) for German Patent Application No. 102013110448.7 dated Mar. 10, 2014, 3 pages.

Official Action (no English translation available) for German Patent Application No. 102013110416.9 dated Mar. 7, 2014, 3 pages.

Examination Report for German Patent Application No. 102010018822.0, dated Jan. 31, 2013, 3 pages.

Examination Report for German Patent Application No. 102011055895.0, dated Feb. 29, 2012, 3 pages.

Examination Report for German Patent Application No. 102011055895.0, dated Oct. 2, 2012, 3 pages.

Examination Report for German Patent Application No. 102011055897.7, dated Feb. 27, 2012, 3 pages.

Official Action for German Patent Application No. 102012104184.9 dated Jan. 21, 2013, 3 pages.

Extended European Search Report for European Patent Application No. 12194405.2, mailed Feb. 8, 2013, 3 pages.

Extended European Search Report for European Patent Application No. 12194557, mailed Feb. 7, 2013, 3 pages.

Official Action (no English translation available) for German Patent Application No. 102013106721.2 dated Mar. 11, 2014, 3 pages.

Official Action for U.S. Appl. No. 13/686,337 mailed Apr. 24, 2014, 11 pages.

Official Action for U.S. Appl. No. 13/686,409 mailed Apr. 24, 2014, 12 pages.

* cited by examiner

VEHICLE SEAT AND UTILITY VEHICLE COMPRISING AT LEAST ONE VEHICLE SEAT

CROSS-REFERENCE TO RELATED APPLICATIONS

This application claims the benefit of German Patent Application No. 10 2013 106 721.2 filed Jun. 26, 2013, the entire disclosure of which is incorporated herein by reference.

FIELD

The invention relates to a vehicle seat comprising a seat part, a backrest and a bearing device for supporting a backrest extension part, in particular an upper backrest part, relative to a lower backrest part of the vehicle seat.

The invention also relates to a utility vehicle, in particular an agricultural utility vehicle, comprising at least one vehicle seat.

BACKGROUND

Various different designs of generic vehicle seats, in particular those for utility vehicles and especially for agricultural utility vehicles, are well-known from the prior art. In this connection, it is also known to divide the backrests of such vehicle seats with respect to their longitudinal extension into a lower backrest part located directly above the seat part in the rear section of the seat part and an upper backrest part which extends the lower backrest part of the backrest in the longitudinal extension of the backrest. The purpose thereof is to increase the flexibility of the vehicle seat especially with respect to its backrest.

Thus for example from the published patent application DE 30 46 049 A1 a vehicle seat is known in which the backrest is divided into at least two parts in order to enable a driver of the vehicle to access more easily the operating elements at the rear or to see the working area behind the driver's seat more easily when sitting in a sideways or backwards working position. Accordingly, the backrest disclosed here has an upper backrest part and a lower backrest part, wherein at least the upper backrest part can be pivoted about a vertical axis. In this way it is possible for the driver to turn at any time using his upper trunk or upper body respectively to reach the operating elements behind the vehicle seat more easily for example, as the upper backrest part can be rotated comfortably about said vertical axis by means of the upper trunk or upper body respectively. In this way the upper backrest part can be rotated at least partly from an area located above the lower backrest part until the vehicle driver can easily reach to the rear over the lower backrest part in order to be able to better manually reach the working area behind the vehicle seat. However, it is a disadvantage here that the upper backrest part that is rotatable about the vertical axis because of its rotary function is only available to support the upper body of the vehicle driver in certain conditions.

SUMMARY

The present invention addresses the problem of developing a generic vehicle seat in such a way that the upper backrest part can be supported relative to the lower backrest part by another bearing device on the one hand so that the upper backrest part provides additional support for the vehicle driver when the latter moves into a sideways or backwards sitting position on the vehicle seat when working. Furthermore, the aim is to provide a bearing device for the upper backrest part with a simple design that is easy to assemble in particular.

The problem addressed by the invention is solved by a vehicle seat comprising a seat part, a backrest and a bearing device for supporting a backrest extension part, in particular a backrest upper part, relative to a lower backrest part of the backrest of the vehicle seat, in which the bearing device comprises a plurality of plain bearing bush units for displacing elongated transverse elements of the backrest extension part along sliding axes arranged perpendicular to the backrest, wherein the plain bearing bush units are assembled using identically designed asymmetrical bearing bush parts.

Of course, in particular these kinds of plain bearing bush units of the plain bearing device can be manufactured to almost any structural design, so as to be able to adjust the upper backrest part relative to the lower backrest part along sliding axes arranged or respectively running perpendicular to the backrest.

However, if the plain bearing bush units are joined together by identically designed asymmetrical bearing bush parts they can be manufactured very inexpensively, as only a single component needs to be produced and used in order to assemble a multi-part plain bearing bush unit.

It is particularly advantageous that the assembly of a plain bearing bush unit formed in this way is simplified considerably as only identically designed asymmetrical plain bearing bush parts are used for this.

In this respect assembly errors are completely impossible during the assembly of the plain bearing bush units, as the latter consist only of identical asymmetrical bearing bush parts. Thus, the plain bearing bush units can be assembled perfectly by people who do not need specific training for this.

The assembly of the plain bearing bush units and thus of the bearing device as a whole can be simplified further if the respective asymmetrical plain bearing bush part has a plain bearing structure that is partly open radially relative to the sliding axis.

By means of this radially partly open plain bearing structure it is possible to fit the respective plain bearing bush part or two plain bearing bush parts of a plain bearing bush unit respectively onto the elongated transverse elements radially to the sliding axis, so that it is not absolutely necessary to push the plain bearing bush parts axially onto the elongated transverse elements in the direction of the sliding axis.

In this way the elongated transverse elements can be already fixed to a frame part of the upper backrest part and thus premounted, before the plain bearing bush units are fitted onto the elongated transverse elements. This generally simplifies the assembly process of the bearing device and thus also of the vehicle seat quite considerably, since to optimise the production process of the vehicle seat the elongated transverse elements are already connected prior to the assembly of the bearing device at both ends by material bonding to the frame part of the upper backrest part.

Preferably, the elongated transverse elements are welded at both ends to the frame part.

In a component of this kind consisting of a frame part and elongated transverse elements plain bearing bush units or plain bearing bush parts respectively can no longer be pushed axially onto the elongated transverse elements afterwards.

Thus, it is particularly advantageous if the respective asymmetrical bearing bush part comprises a radial assembly opening for radially mounting the plain bearing bush part onto one of the elongated transverse elements.

Thus, it is also advantageous if the respective asymmetrical plain bearing bush part forms a portion of a plain bearing structure which is open partly radially relative to the sliding axis.

In the present case the bearing bush part is constructed so that a bearing bush part in each case forms only a portion of a plain bearing structure of the plain bearing bush unit. In this respect it is an advantage if said portion of the plain bearing structure is partly opened radially in order to fit the bearing bush part radially onto the elongated transverse element.

Of course, a relative assembly opening is closed relative to the plain bearing structure ideally in the operating state of the plain bearing bush unit. Therefore, it is an advantage if the respective asymmetrical bearing bush part forms a portion of a plain bearing structure of the plain bearing bush unit, which on its circumference on the one hand has a plain bearing structure gap and on the other hand a gap filling element for closing a plain bearing structure gap of a further asymmetrical bearing bush part corresponding to the asymmetrical bearing bush part of a common plain bearing bush unit.

Within the meaning of the invention the term "plain bearing structure gap" refers to the previously mentioned radial assembly opening for radially mounting the plain bearing bush part onto the elongated transverse element.

The gap filling element is defined in terms of the invention as a plain bearing structure gap filling element for closing said radial assembly opening, so that the plain bearing structure of the plain bearing bush unit is closed around the circumference of the plain bearing opening.

If the identically designed asymmetrical bearing bush parts comprise both a plain bearing structure gap and also a gap filling element for closing such a plain bearing structure gap, the plain bearing bush unit can be assembled particularly advantageously from the two identically designed asymmetrical bearing bush parts.

Ideally the gap filling element is arranged opposite to the plain bearing structure of the plain bearing structure gap, so that the identically designed asymmetrical bearing bush parts only need to be fitted together rotated by 180° with respect to the sliding axis of the plain bearing bush unit in order to provide a circumferentially fully closed plain bearing structure of the plain bearing bush unit.

In this respect according to a further preferred embodiment variant the gap filling element and the plain bearing structure gap are spaced apart from one another by the diameter of a plain bearing opening.

In order that with identical plain bearing bush units, which are assembled according to the invention from identical asymmetrical bearing bush parts, ideally also curved sliding axes and not just straight sliding axes can be formed it is an advantage if a plain bearing bush forming the plain bearing structure passes obliquely through the plain bearing bush unit.

It is advantageous in this case if the sliding axis passes obliquely through the plain bearing bush unit.

In order to reduce the frictional resistance between the plain bearing structure of the plain bearing bush units and the elongated transverse elements, it is an advantage if the plain bearing structure has an inner toothing. In this way it is possible that the plain bearing bush formed by the plain bearing structure does not interact over the full surface with the elongated transverse elements, but only partially.

The structure of the plain bearing bush units is even simpler if the plain bearing bush unit is assembled from two identically designed asymmetrical bearing bush parts, wherein the bearing bush parts are aligned relative to one another with their identically configured sides.

It is advantageous if the bearing bush part comprises a plate-like base body element, the longitudinal extension and width extension of which run perpendicular to the sliding axis of the plain bearing bush unit. In this way the plain bearing bush unit can be particularly narrow in the sliding direction so that maximum sliding movement is not unnecessarily restricted by the plain bearing bush unit.

In this respect according to a preferred embodiment variant the bearing bush part comprises a plate-like base body element, the depth extension of which is aligned with the sliding axis of the plain bearing bush unit. The depth extension is in this case much smaller than the longitudinal extension and still smaller than the width extension, which preferably extends perpendicular to the sliding axis of the plain bearing bush unit.

Consequently, it is also an advantage if the sliding axis of the plain bearing bush unit runs obliquely to the overall depth extension of the plain bearing bush unit.

In particular, if two elongated transverse elements of the backrest extension part are not arranged exactly parallel to one another it is an advantage if at least one of the plain bearing bush units is arranged radially displaceably relative to the sliding axis in a support seat of the bearing device. By means of this radial displaceability it is possible to adjust the height relative to the elongated transverse elements, so that structural variability is possible of the bearing device between the lower backrest part of the backrest and the backrest extension part of the backrest.

In this respect it is advantageous if at least one of the plain bearing bush units is arranged loosely but non-rotatably in the support seat of the bearing device.

The structural cost of the bearing device can be considerably reduced in the present case if two plain bearing bush units forming a common sliding axis are arranged in a mirror inverted manner in support seats of the bearing device. In particular, in this way by having identical plain bearing bush units a curved sliding axis can be formed so that the backrest extension part can be displaced along a curved track perpendicular to the backrest.

Furthermore, it is particularly advantageous if a third plain bearing bush unit arranged radially next to the common axial sliding axis formed by the two plain bearing bush units is arranged between the two plain bearing bush units forming a further axial sliding axis. In this way it is possible to support the backrest extension part by means of at least three plain bearing bush units and two sliding axes relative to the lower backrest part in a compact manner, whereby a particularly robust bearing device can be provided which can also absorb greater forces.

In particular, if the second sliding axis does not run exactly parallel to the first sliding axis on the upper backrest part, it is not only possible to displace said backrest extension part along a curved track perpendicular to the backrest but also to incline it even with this lateral displacement about an imaginary axis of rotation which runs perpendicular to the backrest with the sliding axes, so that the backrest extension part can be pushed not only sideways over the backrest but also to the rear or to the front in the direction of travel.

The design of the present bearing device can also be simplified further if a third plain bearing bush unit arranged radially next to a common sliding axis formed by the two plain bearing bush units is arranged rotated by 90° in a further support seat of the bearing device. In particular in this way by having identical plain bearing bush units radial displacement relative to the sliding axis can be resolved easily by at least one of the plain bearing bush units.

The assembly of two bearing bush parts to form a plain bearing bush unit can also be simplified further if the bearing bush part on an assembly side corresponding with a further bearing bush part comprises at least one web element which can be inserted into an assembly bore of the additional bearing bush part to form the plain bearing bush unit.

In this respect it is an advantage if the asymmetrical bearing bush part comprises both web elements of this kind and also assembly bores of this kind so that two asymmetrical bearing bush parts can be fitted together without causing problems in order to produce a compact plain bearing bush unit.

Furthermore, by means of such an assembly web element, which when joining together the two asymmetrical bearing bush parts is fitted into a corresponding assembly bore, the stability of the thus assembled plain bearing bush unit is considerably increased.

The integrity of the plain bearing bush unit can be improved even further if the assembly web element and the gap filling element are arranged on the same side of the bearing bush part, so that the two symmetrical bearing bush parts, which form the plain bearing bush unit, are inter-locked on the one hand by one or more assembly web elements and in addition by the gap filling element.

A plain bearing bush unit assembled in this way then just needs to be inserted or fitted respectively into a suitably formed support seat of the bearing device, in order to connect together the two asymmetrical bearing bush parts securely in the assembled state of the bearing device.

Of course, the identically designed asymmetrical bearing bush parts and thereby also the respective plain bearing bush unit assembled therefrom can be manufactured from almost any material. In terms of manufacturing processes it is particularly convenient to make the identically designed asymmetrical bearing bush parts from a plastics material.

The problem to be addressed by the invention is also solved by a utility vehicle, in particular an agricultural utility vehicle, comprising at least one vehicle seat, wherein the utility vehicle or the agricultural utility vehicle respectively comprises a vehicle seat according to any of the features disclosed here.

If the utility vehicle, in particular the agricultural utility vehicle, comprises the vehicle seat according to the invention a particularly easily operated and robust backrest extension part can be provided especially for the vehicle driver, which makes the vehicle seat much easier to operate.

At this point it should be mentioned that the backrest extension part can also comprise in addition or alternatively a head support part.

Further advantages, aims and properties of the present invention are explained with reference to the attached drawing and following description, in which a vehicle seat comprising the plain bearing bush units assembled according to the invention is illustrated and described by way of example.

DETAILED DESCRIPTION

Figure 1:
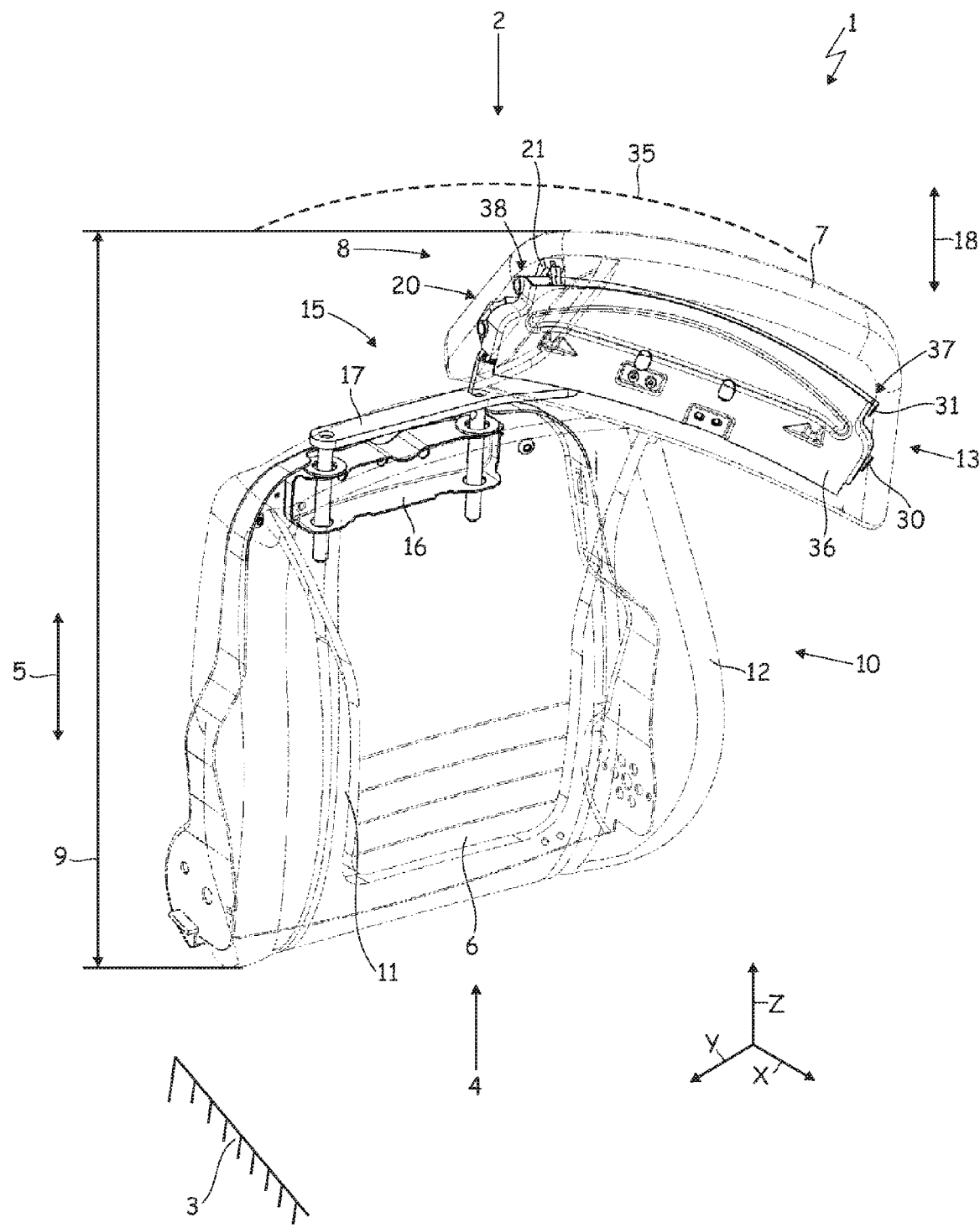
FIG. 1 shows schematically a perspective partial view of a vehicle seat with a bearing device comprising identically designed asymmetrical bearing bush parts of plain bearing bush units for supporting in a linearly displaceable manner the elongated transverse elements of a backrest extension part.

The vehicle seat 1 shown only partly in FIG. 1 is a utility vehicle seat 2 of a utility vehicle 3 with a back rest 4 not shown in more detail here and with a seat part not shown here.

The backrest 4 is divided with respect to its longitudinal extension 5 into a lower backrest part 6 and an upper backrest part 7 arranged above it in the form of a backrest extension part 8.

In this respect the lower backrest part 6 in combination with the upper backrest part 7 forms the total height 9 of the backrest 4 on the vehicle seat 1.

The backrest extension part 8 can also comprise a head support part in a suitable embodiment of the backrest 4 (not shown here), but this is not the case in the embodiment shown here.

Said agricultural utility vehicle 3 defines a vehicle longitudinal extension X, a vehicle width extension Y and a vehicle height extension Z, which are also used in relation to the orientation of the present vehicle seat 1.

In this respect by means of the longitudinal extension X of the vehicle in particular a position or change in position respectively of the upper backrest part 7 can be defined as "forwards" or "backwards" respectively with respect to the backrest 4 or the lower backrest part 6.

By means of the vehicle width extension Y therefore a position or change in position respectively of the backrest extension part 8 or the upper backrest part 7 respectively can be defined as "to the side of" or "next to" respectively to the backrest 4 or the lower backrest part 6.

Moreover, by means of the vehicle height extension Z also in relation to the backrest extension part 8 or the upper backrest part 7 respectively a position or change is position respectively can be defined as "up" or "down" respectively relative to the backrest 4 or the lower backrest part 6.

The total height 9 thus extends in the direction of the vehicle height extension Z.

The lower backrest part 6 is configured to be more contoured with a lower padded part 10 with outer bolster parts 11 and 12 than an upper padded part 13 of the upper backrest part 7.

The upper backrest part 7 is mounted in this embodiment on the lower backrest part 6 by means of a mounting device 15. Said mounting device 15 comprises on the lower backrest part 6 a mounting support 16, into which an insertion mount 17 is inserted and can be mounted accordingly on the mounting support 16.

Figure 2:
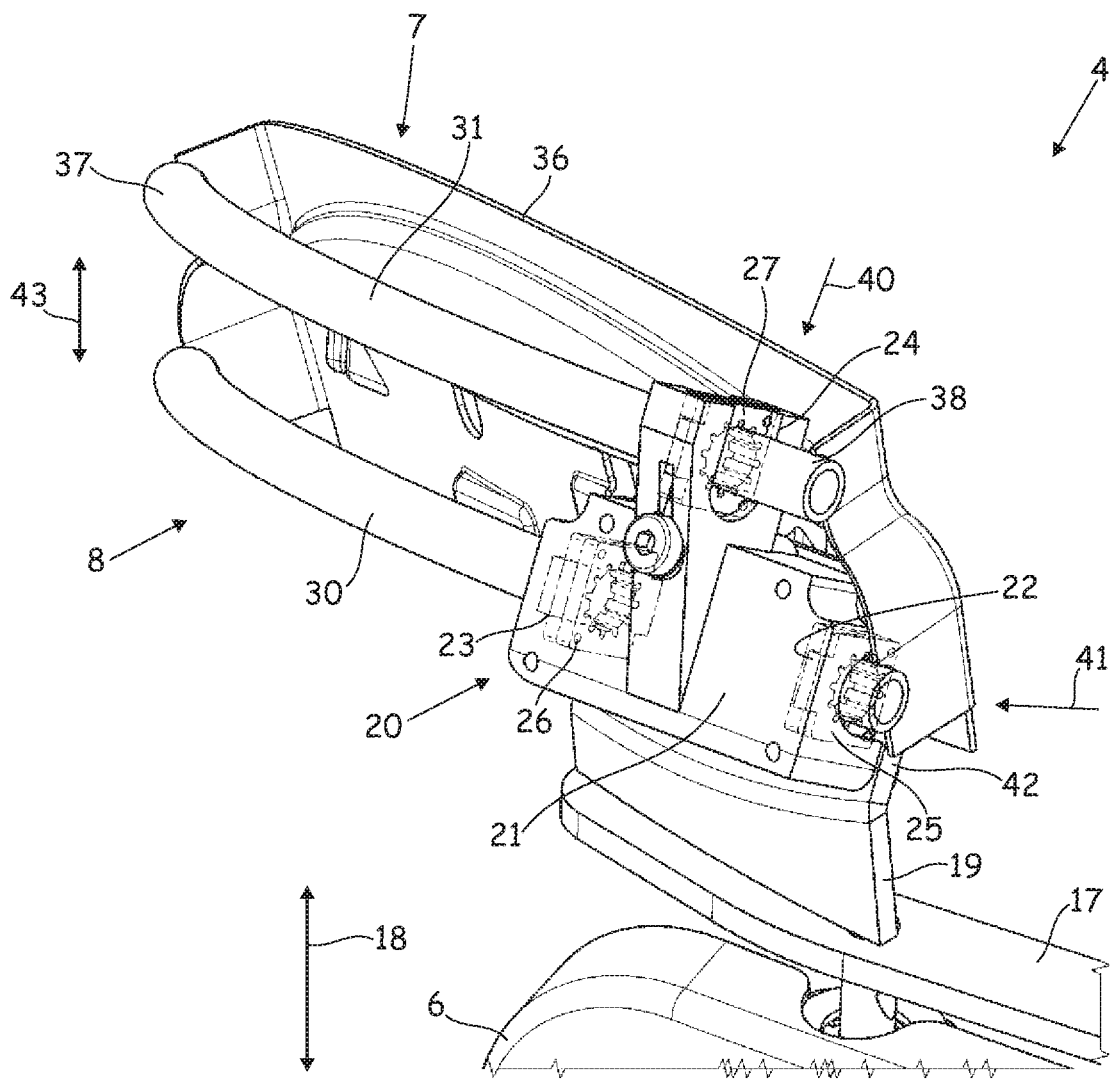
FIG. 2 shows schematically a rear view of the bearing device of FIG. 1.

As shown in particular from the view according to FIG. 2, the insertion mount 17 comprises an angled plate 19 aligned in the vertical direction 18 onto which a bearing device 20 of the backrest extension part 8 is screwed.

The bearing device 20 comprises a housing 21 made of metal which forms a total of three support seats 22, 23 and 24, in which three plain bearing bush units 25, 26 and 27 made of plastics material are fitted.

By means of the plain bearing bush units 25 and 26 a lower elongated transverse element 30 of the backrest extension part 8 is supported on the mounting device 15. By means of the third plain bearing bush unit 27 a further elongated transverse element 31 of the backrest extension part 8 is also supported on the mounting device 15.

The two elongated transverse elements 30 and 31 run perpendicular to the backrest 4 and over a long distance essentially parallel to one another; however they are also curved in parts to varying degrees.

In this respect the two plain bearing bush units 25 and 26 form a first axial sliding axis 33 and the third plain bearing bush unit 27 forms a second axial sliding axis 34, which axes are perpendicular to the backrest 4.

Thus the backrest extension part 8 can be displaced as a whole along a curved displacement track 35 (see FIG. 1) perpendicular to the backrest 4.

In this way it is possible that the backrest extension part 8 can be pushed out not only sideways over the left side bolster part 12 of the lower backrest part 6 but can also be rotated forwards in the direction of the vehicle longitudinal extension X about a vertical axis and can thereby also be tilted to the rear about a horizontal axis relative to the vehicle longitudinal extension X.

The two elongated transverse elements 30 and 31 are welded in this case to a frame part 36 of the backrest extension part 8 at their respective frame end portions 37 or 38 respectively (here only the further elongated transverse element 31 is numbered). Thus, the two elongated transverse elements 30 and 31 are connected securely to the frame part 36 of the backrest extension part 8, whereby a high degree of strength and high degree of structural stability can be ensured on the backrest extension part 8.

Whereas the third plain bearing bush unit 27 is arranged inserted loosely from above into the third support seat 24, the two plain bearing bush units 25 and 26 are inserted into the first support seat 22 or into the second support seat 23 respectively from an insertion direction 41 that is perpendicular to the insertion direction 40.

The plain bearing bush units 25 and 26 are secured in their respective plain bearing seat 22 or 23 respectively, in that the housing 21 of the bearing device 20 is screwed onto the upper leg 42 of the angled plate 19.

In this respect, the plain bearing bush units 25 and 26 are secured in their respective support seat 22 or 23 respectively, whereas the third plain bearing bush unit 27 is mounted radially displaceably in the third support seat 24 relative to the second axial sliding axis 34.

In this way in a structurally very simple manner with respect to the two plain bearing bush units 25 and 26 relative to the third plain bearing bush unit 27 a height adjustment is performed with respect to the differently curved elongated transverse elements 30 and 31.

In order to keep the height of the third support seat 24 lower than the height of the support seats 22 and 23, the third plain bearing bush unit 27 is installed into the third support seat 24 rotated by 90° relative to the two other plain bearing bush units 25 and 26.

In order to manufacture the plain bearing bush units 25, 26 and 27 particularly simply and inexpensively the latter are designed to be identical. In this way it is possible to provide the bearing device 20 with a total of three identical plain bearing bush units 25, 26 and 27, so that the support seats 22, 23 and 24 are also identical in design apart from their respective spatial position 44 as a whole and in particular on the bearing device 20. In this way the structure of the bearing device 20 is simplified considerably.

Figure 4:
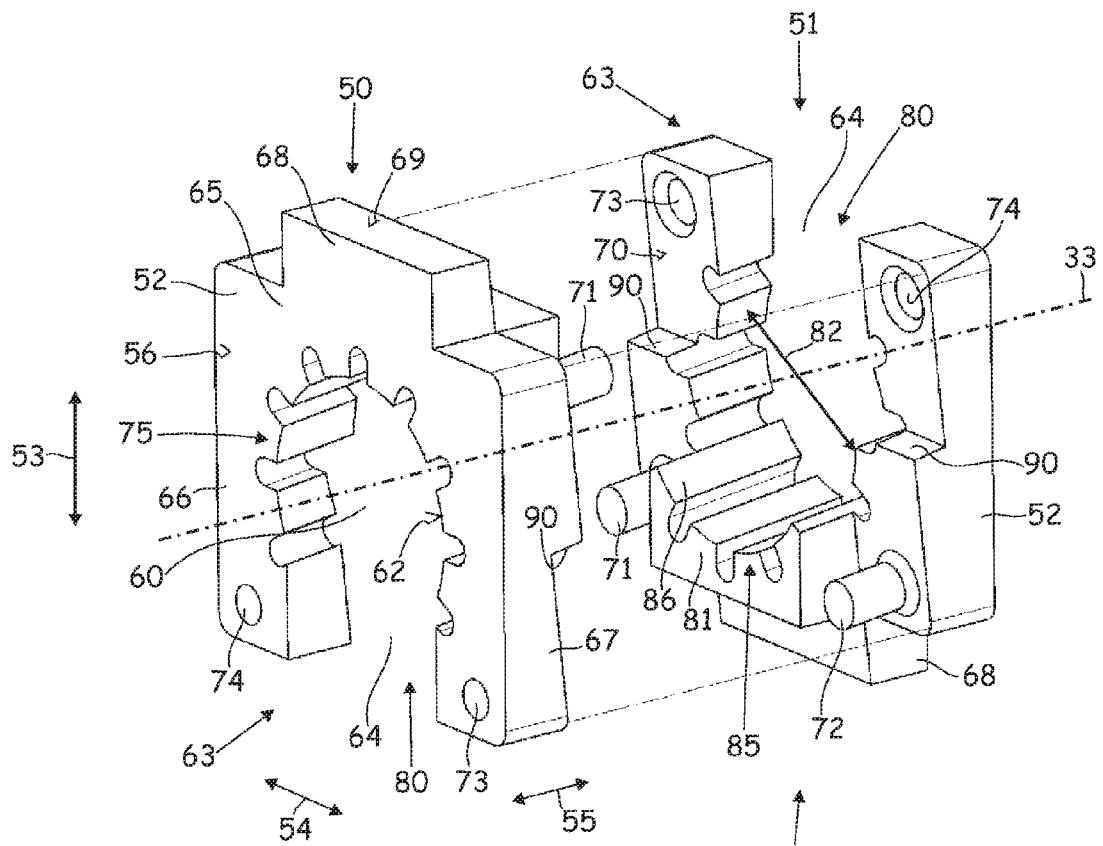
FIG. 4 shows schematically a detailed view of the asymmetrical bearing bush parts of one of the bearing bush units of the bearing device of FIGS. 1 to 3.
Figure 5:
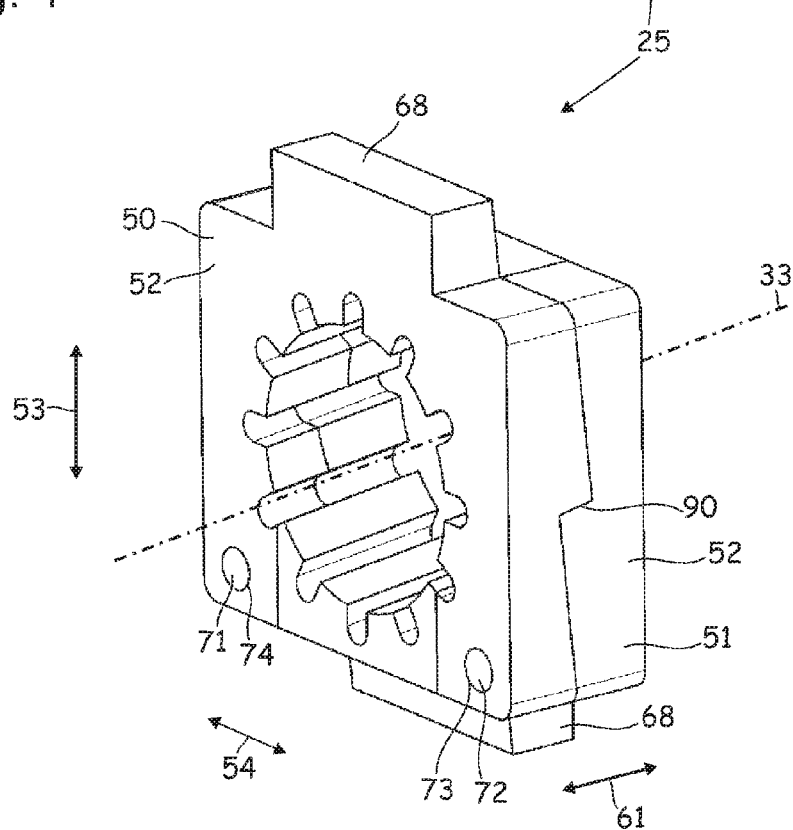
FIG. 5 shows schematically a detailed view of one of the bearing bush units of the bearing device assembled from the asymmetrical bearing bush parts of FIGS. 1 to 4.

Moreover, the structure and the manufacture respectively of the plain bearing bush units 25, 26 and 27 is also extremely simple, as each of the plain bearing bush units 25, 26 and 27 are composed of two identically designed asymmetrical bearing bush parts 50 and 51, as shown clearly in the representations of FIGS. 4 and 5.

Said bearing bush parts 50 and 51 are designed to be identical so that all of the plain bearing bush units 25, 26 and 27 can be joined together by a single component.

In order that the bearing bush parts 50 and 51 can form in a functionally high-quality manner the plain bearing bush unit 25, 26 and 27, the respective bearing bush part 50 or 51 respectively comprises a single asymmetrical plate-like base body element 52.

At this point it should be noted in particular that all of the features relating to the asymmetrical plate-like base body element 52 also apply to the identically designed asymmetrical bearing bush parts 50 and 51 and vice versa.

The asymmetrical plate-like base body element 52 and thereby also each of the identically designed asymmetrical bearing bush parts 50 and 51 have a longitudinal extension 53 and a width extension 54 which are in each case perpendicular to the respective sliding axis 33 or 34 respectively of the corresponding plain bearing bush unit 25 and 26 or 27 respectively.

Furthermore, the plate-like base body element 52 has a depth extension 55 which runs in the direction of the respective sliding axis 33 or 34 respectively of the corresponding plain bearing bush unit 25 and 26 or 27 respectively, i.e. is essentially aligned with the respective sliding axes 33 or 34 respectively.

In this case the depth extension 55 is many times smaller than the longitudinal extension 53 or the width extension 54.

In this specific embodiment the depth extension 55 is six times smaller than the longitudinal extension 53 and still four times smaller than the width extension 54.

In this way it is possible to design the plain bearing bush units 25, 26 and 27 to be very narrow in the direction of the sliding axis 33 or 34 respectively but still to have sufficiently large outer support surfaces 56 on the asymmetrical plate-like base body element 52 relative to the respective support seat 22, 23 or 24.

On the other hand, by having such a small depth extension 55 and also very narrow plain bearing bush units 25, 26 and 27 in the direction of the sliding axes 33 or 34 respectively it is possible to occupy only a small amount of space, which means that the space gained can be used to provide the longest possible adjustment distance (not indicated here) on the curved displacement track 35 for the backrest extension part 8.

The asymmetrical plate-like base body element 52 is furthermore characterised by a plain bearing opening 60, which passes through the asymmetrical plate-like base body element 52 obliquely relative to the outer support surfaces 56.

In this respect the two sliding axes 33 or 34 respectively also run obliquely through the respective plain bearing bush units 25, 26 and 27.

In this way the respective sliding axis 33, 34 and also the asymmetrical plate-like base body element 52 and correspondingly also the plain bearing bush units 25, 26 and 27 formed thereby run obliquely relative to the depth extension 55 of the asymmetrical plate-like base body element 52 and thus also obliquely to the respective total depth extension 61 of the respective plain bearing bush unit 25, 26 and 27.

By means of the plain bearing opening 60 a plain bearing structure 62 is formed in the asymmetrical plate-like base body element 52 and thus, as already explained above, also on the respective asymmetrical bearing bush part 50 or 51 respectively.

Owing to the aforementioned obliquely arranged plain bearing opening 60 inside the asymmetrical plate-like base body element 52 said plain bearing structure 62 is also arranged obliquely in the respective asymmetrical bearing bush part 50 or 51 respectively and thus also in the respective plain bearing bush unit 25, 26 or 27 respectively. In other words, the plain bearing structure 62 formed in the asymmetrical plain bearing bush 50 or 51 respectively also passes through the respective plain bearing bush unit 25, 26 or 27 respectively obliquely.

In order that the asymmetrical bearing bush parts 50 and 51 can still be attached subsequently to the elongated transverse elements 30 and 31 welded securely to the frame part 36, the plain bearing structure 62 is at least partly open relative to the respective sliding axis 33 or 34 respectively, whereby on a short side 63 of the asymmetrical plate-like base body element 52 a corresponding radial assembly opening 64 is provided for radially mounting the respective asymmetrical bearing bush part 50 or 51 respectively on one of the elongated transverse elements 30 or 31 respectively.

In this respect the respective asymmetrical bearing bush part 50, 51 forms a portion (not numbered explicitly here) of the plain bearing structure 62 of the respective plain bearing bush unit 25, 26 and 27, which is partly open radially relative to the respective sliding axis 33 or 34 respectively.

In this respect, the asymmetrical plate-like base body element 52 is designed to be U-shaped and has in this case a base body part 65 and two adjoining leg body parts 66 and 67, which are opposite one another.

On the base body part 65 an assembly stud element 68 protruding radially relative to the respective sliding axis 33 or 34 respectively is provided or formed respectively on the asymmetrical plate-like base body element 52, which can be inserted into a corresponding recess (not shown here) of one of the support seats 22, 23 or 24 respectively, whereby the respective plain bearing bush unit 25, 26 or 27 respectively is secured more tightly into the respective support seat 22, 23 or 24 respectively. This effect is increased further as the assembly stud element 68 runs conically from its head side 69 to the base body part 65.

Two asymmetrical plate-like base body elements 52 or two asymmetrical bearing bush parts 50 and 51 respectively can be joined together particularly stably to form the respective plain bearing bush unit 25, 26 and 27, as the asymmetrical plate-like base body element 52 comprises on its front side or assembly side 70 respectively two assembly web elements 71 and 72.

These two assembly web elements 71 and 72 are located on the base body part 65.

At the free ends of the respective leg body parts 66 or 67 respectively there are corresponding assembly bores 73 and 74, into which the assembly web elements 71 and 72 can be inserted respectively, when the two asymmetrical bearing bush parts 50 and 51 are joined together.

Furthermore, the respective asymmetrical bearing bush part 50 or 51 respectively on the circumference 75 of the plain bearing structure 62 is provided on the one hand with a plain bearing structure gap 80 and on the other hand by a gap filling element 81 for closing a plain bearing structure gap 80 of a further asymmetrical bearing bush part 51 corresponding with the asymmetrical bearing bush part 50.

In this case the plain bearing structure gap 80 and the gap filling element 81 are spaced apart from one another by the diameter 82 of the plain bearing opening 60.

The gap filling element 81 in this case protrudes over the assembly side 70 so that in the assembled state of the respective plain bearing bush unit 25, 26 or 27 respectively the gap filling element 81 of the bearing bush part 50 engages with the plain bearing structure gap 80 of the corresponding bearing bush part 51 and vice versa and closes the latter respectively such that a radially fully closed plain bearing structure 62 is formed on the respective plain bearing bush unit 25, 26 or 27 respectively.

In order to effectively reduce the frictional resistance between the plain bearing bush units 25, 26 and 27 and the elongated transverse units 30 or 31v, the plain bearing structure 62 has an inner plain bearing toothing 85 with plain bearing teeth 86 (here numbered only by way of example). In this way it is possible to ensure that the respective plain bearing bush unit 25, 26 and 27 only comes into active contact with the respective elongated transverse element 30 or 31 respectively with its plain bearing teeth 86, whereby there is a smaller frictional area between the plain bearing bush units 25, 26 or 27 respectively and the elongated transverse units 30 or 31 respectively.

In order to then join the two asymmetrical bearing bush parts 50 and 51 to the respective plain bearing bush units 25, 26 or 27 respectively, the two asymmetrical bearing bush parts 50 and 51 are fitted radially in each case onto one of the elongated transverse elements 30 or 31 respectively.

Afterwards the two asymmetrical bearing bush parts 50 or 51 respectively, as shown according to the view of FIG. 4, are rotated about the axial sliding axis 33 or 34 respectively or about the respective elongated transverse element 30 or 31 respectively so that the second asymmetrical bearing bush part 50 is rotated relative to the first asymmetrical bearing bush part 50 by 180°.

Thus, the two asymmetrical bearing bush parts 50 or 51 respectively are rotated with their respective assembly side 70 by only 180° and can be moved towards one another and joined together in this way.

In this case on the one hand the gap filling element 81 is inserted into the plain bearing structure gap 80 and on the other hand the respective assembly web elements 71 or 72 respectively are inserted into the respective corresponding assembly bore 73 or 74 respectively.

The two asymmetrical bearing bush parts 50 and 51 are clamped together with respect to their longitudinal extension 53 by clamping surfaces 90 (only numbered explicitly), so that both asymmetrical bearing bush parts 50 or 51 respectively are joined together securely as a plain bearing bush unit 25, 26 or 27, as shown according to the view of FIG. 5.

Figure 3:
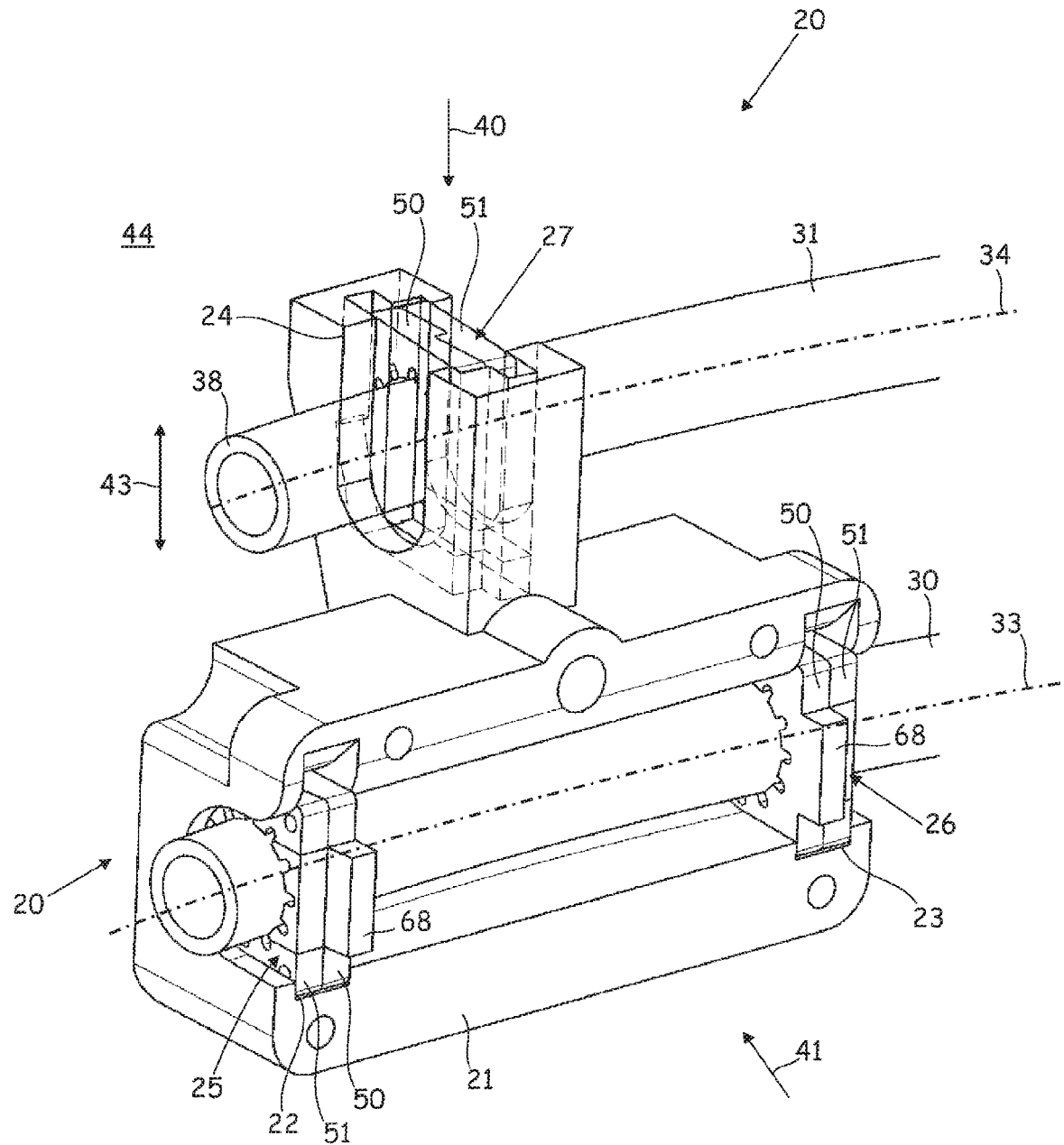
FIG. 3 shows schematically a detailed view of the bearing device of FIGS. 1 and 2.

Even a curved axial sliding axis 33 can be obtained by means of a single identical plain bearing bush unit 25, 26 or 27 respectively, when two plain bearing bush units 25 and 26 forming the common sliding axis 33 are arranged in a mirror inverted manner in the support seats 22 or 23 respectively of the bearing device 20, as shown particularly clearly in the representation according to FIG. 3.

Of course, the embodiment explained above is only a first configuration of the vehicle seat comprising the plain bearing bush units according to the invention. In this respect, the configuration of the invention is not restricted to this embodiment.

All of the features disclosed in the application documents are claimed as being essential to the invention insofar as they are novel in relation to the prior art either individually or in combination.

LIST OF REFERENCE NUMBERS 1 vehicle seat
2 utility vehicle seat
3 agricultural utility vehicle seat 4 backrest
5 longitudinal extension
6 lower backrest part
7 upper backrest part
8 backrest extension part
9 total height
10 lower padded part
11 right side bolster part
12 left side bolster part
13 upper padded part
15 mounting device
16 mounting support
17 insertion mount
18 vertical direction
19 angled plate
20 bearing device
21 housing
22 first support seat
23 second support seat
24 third support seat
25 first plain bearing bush unit
26 second plain bearing bush unit
27 third plain bearing bush unit
30 first elongated transverse element
31 further elongated transverse element
33 first axial sliding axis
34 second axial sliding axis
35 curved displacement track
36 frame part
37 first end portions
38 second end portions
40 insertion direction
41 transverse insertion direction
42 upper leg
43 height adjustment
44 spatial position
50 first asymmetrical bearing bush part
51 second asymmetrical bearing bush part
52 asymmetrical plate-like base body element
53 longitudinal extension
54 width extension
55 depth extension
56 outer support surfaces
60 plain bearing opening
61 total depth extension
62 plain bearing structure
63 short side
64 assembly opening
65 base body part
66 first leg part of the body
67 second leg part of the body
68 assembly stud element
69 head side
70 assembly side
71 first assembly web element
72 second assembly web element
73 first assembly bore
74 second assembly bore
75 circumference
80 plain bearing structure gap
81 gap filling element
82 diameter
85 inner plain bearing toothing
86 plain bearing tooth
90 clamping surfaces
X vehicle longitudinal extension
Y vehicle width extension
Z vehicle height extension

What is claimed is:

1. A vehicle seat, comprising:
a seat part, a backrest and a bearing device for supporting a backrest extension part relative to a lower backrest part of the backrest of the vehicle seat,
wherein
the bearing device comprises a plurality of plain bearing bush units for supporting elongated transverse elements of the backrest extension part along sliding axes arranged perpendicular to the backrest, and wherein the plain bearing bush units are assembled from identically designed asymmetrical bearing bush parts and the respective asymmetrical bearing bush part has a plain bearing structure that is partly open radially relative to the sliding axis.

2. The vehicle seat according to claim 1,
wherein
the respective asymmetrical bearing bush part comprises a radial assembly opening for radially mounting the asymmetrical bearing bush part onto one of the elongated transverse elements.

3. The vehicle seat according to claim 1,
wherein
the respective asymmetrical bearing bush part forms a portion of a plain bearing structure of the plain bearing bush unit, which is partly open radially relative to the sliding axis.

4. The vehicle seat according to claim 1,
wherein
the respective asymmetrical bearing bush part forms a portion of a plain bearing structure of the plain bearing bush unit, wherein the plain bearing structure on its circumference on the one hand has a plain bearing structure gap and on the other hand a gap filling element for closing a plain bearing structure gap of a further asymmetrical bearing bush part of a common plain bearing bush unit corresponding to the asymmetrical bearing bush part.

5. The vehicle seat according to claim 4,
wherein
the plain bearing structure gap and the gap lining element are spaced apart from one another by the diameter of a plain bearing opening.

6. The vehicle seat according to claim 4, wherein the assembly web element and the gap filling element are arranged on the same bearing bush part side.

7. The vehicle seat according to claim 1,
wherein
a plain bearing structure formed in the asymmetrical plain bearing bush passes obliquely through the plain bearing bush unit.

8. The vehicle seat according to claim 1,
wherein
the sliding axis passes obliquely through the plain bearing bush unit.

9. The vehicle seat according to claim 1,
wherein
the sliding axis of the plain bearing bush unit runs obliquely to the total depth extension of the plain bearing bush unit.

10. The vehicle seat according to claim 1,
wherein
the plain bearing structure comprises an inner plain bearing toothing.

11. The vehicle seat according to claim 1,
wherein
the plain bearing bush unit is assembled from two identically designed asymmetrical bearing bush parts, wherein the bearing bush parts are aligned with one another on their identically configured side.

12. The vehicle seat according to claim 1, wherein the asymmetrical bearing bush part comprises a plate-like base body element having a longitudinal extension and a width extension of which are perpendicular to the sliding axis of the plain bearing bush unit.

13. The vehicle seat according to claim 1, wherein the asymmetrical bearing bush part comprises a plate-like base element having a depth extension is aligned with the sliding axis of the plain bearing bush unit.

14. The vehicle seat according to claim 1, wherein at least one of the plain bearing bush units is arranged radially displaceably relative to the sliding axis in a support seat of the bearing device.

15. The vehicle seat according to claim 1, wherein a third plain bearing bush unit arranged radially next to a common sliding axis formed by the two plain bearing bush units is arranged rotated by 90° in an additional support seat of the bearing device.

16. The vehicle seat according to claim 1, wherein two plain bearing bush units forming a common sliding axis are arranged in a mirror inverted manner in support seats of the bearing device.

17. The vehicle seat according to claim 1, wherein a third plain bearing bush unit arranged radially next to the common axial sliding axis formed by the two plain bearing bush units is arranged between the two plain bearing bush units and forms a further axial sliding axis.

18. The vehicle seat according to claim 1, wherein the asymmetrical bearing bush part on an assembly side corresponding with a further asymmetrical bearing bush part comprises at least one assembly web element, which can be inserted into an assembly bore of the other asymmetrical bearing bush part to form the plain bearing bush unit.

19. A utility vehicle comprising at least one vehicle seat, wherein the at least one vehicle seat is configured according to claim 1.

* * * * *